United States Patent [19]

Nadherny

[11] Patent Number: 4,519,564
[45] Date of Patent: May 28, 1985

[54] ADJUSTABLE SUPPORT ASSEMBLY

[75] Inventor: Rudolph E. Nadherny, Naperville, Ill.

[73] Assignee: Ireco, Inc., Chicago, Ill.

[21] Appl. No.: 429,252

[22] Filed: Sep. 30, 1982

[51] Int. Cl.³ .............................................. F16L 3/00
[52] U.S. Cl. ...................................... 248/58; 248/75;
   248/327; 24/115 H; 24/30.5 R; 285/63
[58] Field of Search .......... 24/18, 302, 115 H, 30.5 R,
   24/17 A, 298, 115 G, 115 K, 19, 68 BT;
   248/58-60, 62, 75, 317, 327-328, 102, 499;
   285/63; 213/1.3, 1 R, 76

[56] References Cited

U.S. PATENT DOCUMENTS

| | | | |
|---|---|---|---|
| 852,180 | 4/1907 | Hoffman | 24/298 |
| 1,086,442 | 2/1914 | Cornelius | 248/5 G |
| 1,600,756 | 9/1926 | Fairbanks | 24/128 R |
| 1,945,932 | 2/1934 | Caley | 24/17 A |
| 2,693,760 | 1/1955 | Roth et al. | |
| 2,872,141 | 2/1959 | Hefner . | |
| 2,919,946 | 1/1960 | Miener | 248/499 |
| 2,974,916 | 3/1961 | Richey | 24/302 |
| 2,996,315 | 8/1961 | Roth et al. | |
| 3,422,964 | 1/1969 | Nadherny . | |
| 3,424,415 | 1/1969 | Nadherny . | |
| 3,592,425 | 7/1971 | Randolph et al. . | |
| 3,913,178 | 10/1975 | Ballin | 24/30.5 R |
| 3,933,377 | 1/1976 | Arrowood . | |
| 3,979,094 | 9/1976 | DeWitt | 24/302 |
| 4,342,477 | 8/1982 | McClure . | |

Primary Examiner—William H. Schultz
Assistant Examiner—Robert A. Olson
Attorney, Agent, or Firm—Lockwood, Alex, Fitzgibbon & Cummings

[57] ABSTRACT

An adjustable support assembly is provided for suspending or otherwise attaching one article such as a conduit to another article such as a frame. The adjustable support assembly includes a pair of inelastic, flexible cables that are secured together at spaced locations by retainers in order to form a series of elongated eyes. One of the cables extends beyond the other cable and has a tapered stop secured to its free end. When used, the adjustable support assembly is wrapped around the article being suspended or attached, and the tapered stop is passed through one of the elongated eyes and wedged therein in order to secure the free end to the elongated eye of the adjustable support assembly.

29 Claims, 14 Drawing Figures

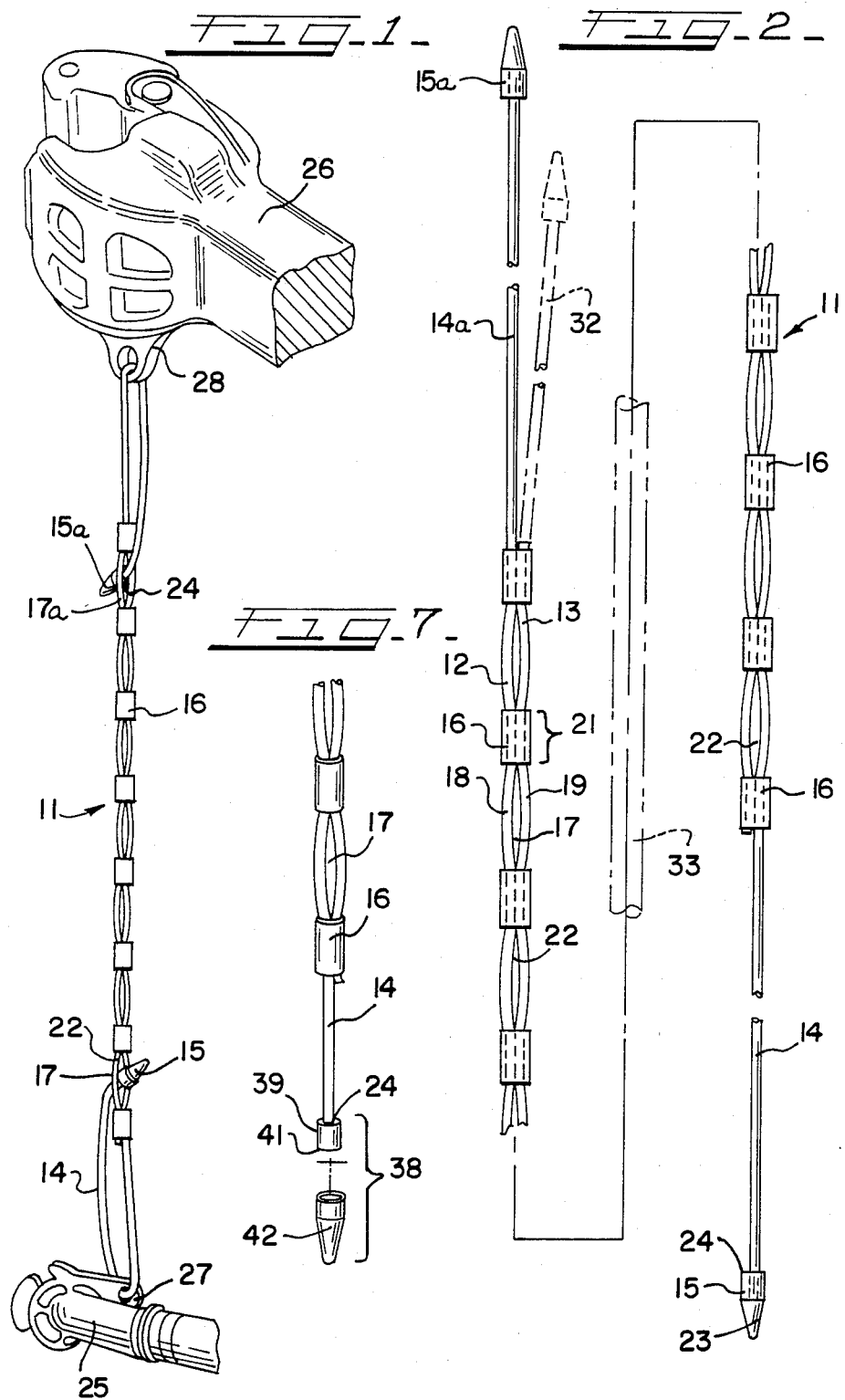

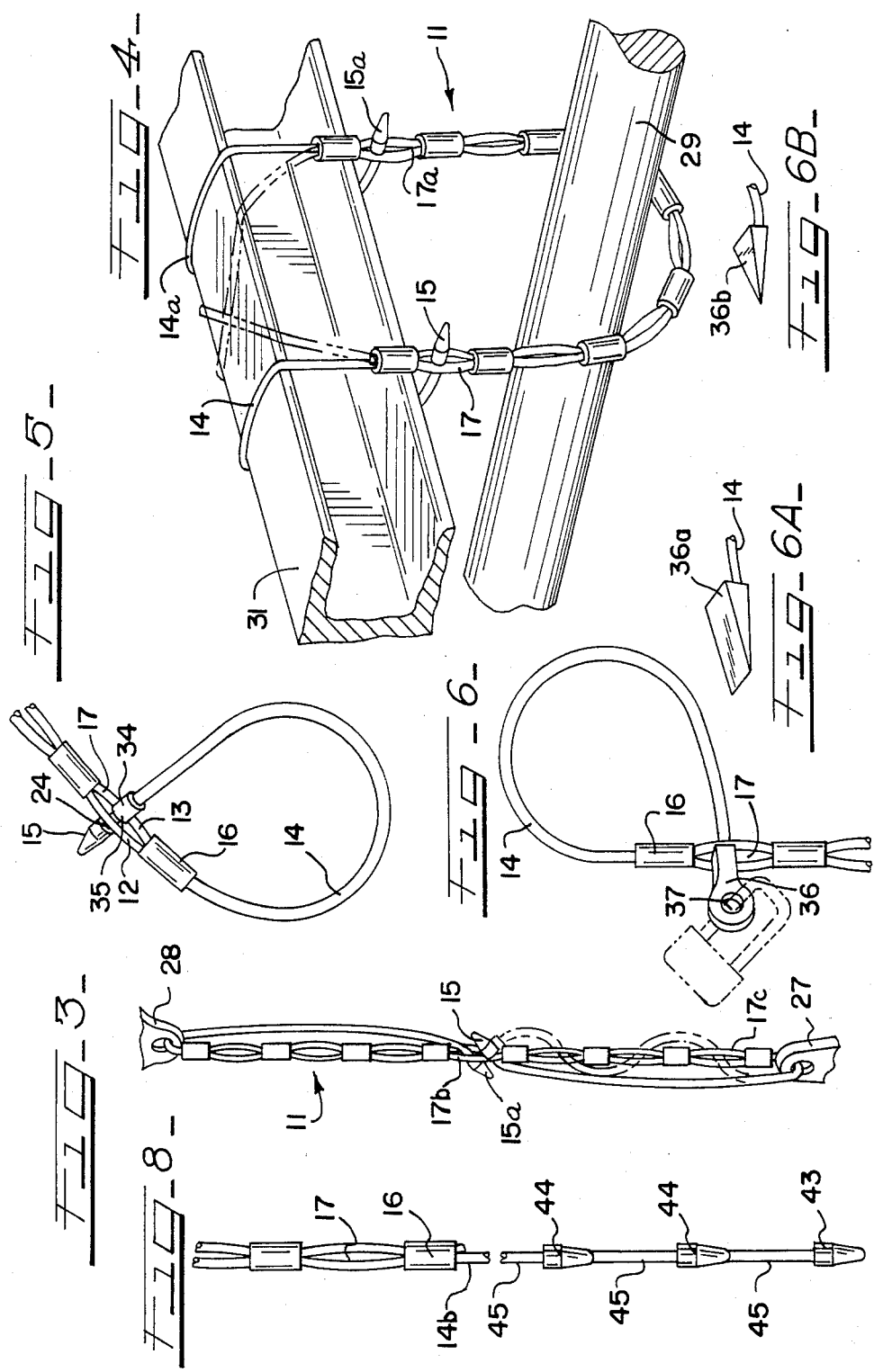

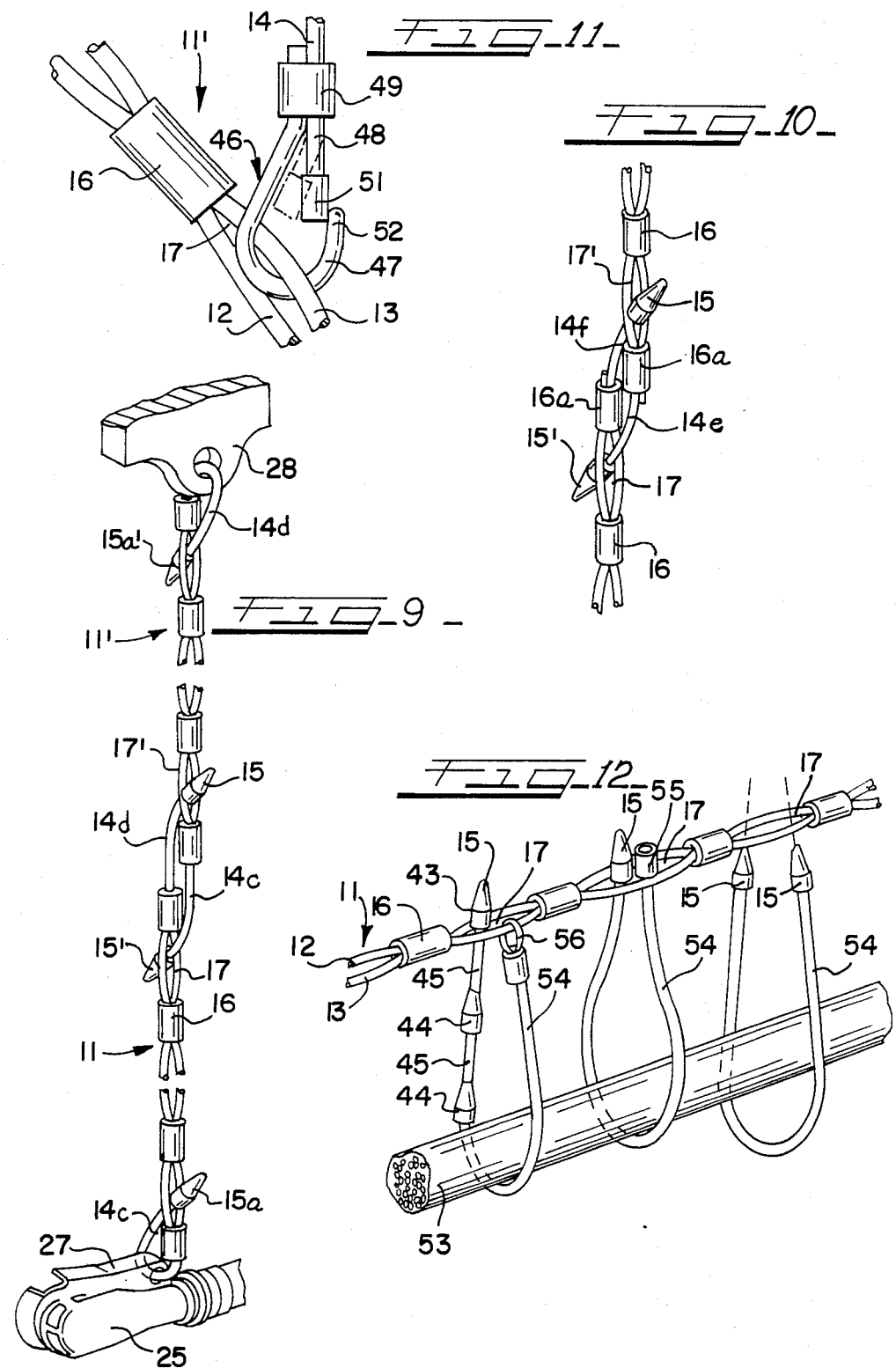

ADJUSTABLE SUPPORT ASSEMBLY

BACKGROUND AND DESCRIPTION OF THE INVENTION

The present invention generally relates to an improved adjustable support assembly, more particularly to a support assembly that is exceptionally durable and adaptable for use in a wide variety of applications, especially those applications where a conduit-like member is supported by and suspended from a support member. The invention is particularly suitable for use in suspending conduits such as brake hoses and bottom rods from couplers or beams of railway cars, although it is also quite useful for almost any type of attachment, suspension or hold down application. The adjustable support assembly includes a plurality of inelastic, flexible cables that are secured together at spaced locations by a plurality of retaining members to form a series of elongated eyes for receiving and wedging therewithin a free end of one of the inelastic, flexible cables in order to complete the formation of a support loop of a desired size and configuration.

In any number of applications, there is a need for a device for securely attaching, supporting and/or suspending one member from another member. Often, an elongated member must be suspended from a generally stationary member in a manner whereby the suspended elongated member retains some freedom of movement with respect to the stationary support member. For example, in U.S. Pat. No. 3,422,964, an air brake hose of a railway car is suspended from the railway car coupler by a device that includes a suspension chain having quick-connect means, which suspension device allows for limited movement of the air brake hose in order to facilitate connection of the air brake hose to the remainder of the air brake mechanism while permitting the air brake hose to move as needed in order to avoid undesired uncoupling while still restricting movement of the hose to an extent that uncoupling is accomplished only when such is desired.

Other applications find a need for a support assembly that attaches one article or member to another while providing enough flexibility and limited movement so as to retain the member being suspended within an area of movement that is limited according to the particular needs of the structures involved. Such limited movement may be to maintain a desired distance between the suspending and suspended members, such as for an air brake hose of a railway car, a mooring line, a guide wire, a hoist cable, a fixture hanger, or the like. Another general type of application is that of a secondary or safety support mechanism in order to retain an article such as an elongated member in place should the elongated member become inadvertently disconnected from its primary support, which application includes safety cables and a safety support for a member such as a bottom rod of a railway brake mechanism in case the bottom rod becomes disconnected from the brake lever and would otherwise fall from the railway car. A further general type of application is to securely and tightly affix one member to another in order to effect fast repairs, such as affixing an exhaust pipe or the like to the undercarriage of an automobile, or in order to replace a cotter pin or to provide railway car seals.

It is also desirable to provide support assemblies that are easily adjustable in order to vary the support, suspension or attachment length provided by a support device. Such an adjustability feature makes it possible to increase or decrease the suspension length and, when desired, to secure the members together in an abutting fashion by drawing the adjustable support device tightly around the supporting and supported members. These types of support devices should also be inexpensive and easy to use and construct, while still providing a sufficient latitude of adjustability so as to make the device useful for a wide variety of applications. Because of the demanding nature of many of these support applications, a support device is also needed which is especially strong and capable of withstanding severe environmental conditions of the type that are encountered by the undercarriages of railway and road vehicles and the like.

The present invention achieves all of these features and advantages by providing a support assembly having elongated eyes spaced therealong, the support assembly having a one-way means at a free end thereof that enters and passes through a selected elongated eye, and that is retained within that eye against forces exerted in a direction other than the entry direction, said retention being due to a combination of the wedging character of the elongated eye and a stop structure on the one-way means. In this way, the user of this adjustable support assembly can thread a free end of the adjustable support assembly through a supporting aperture and/or wrap the adjustable support assembly around the supporting member and/or the supported member. The one-way aspect of this invention permits passage of the free end through the elongated eye in the leading direction of the free end while substantially preventing unintentional passage therethrough in the opposite or trailing direction thereof.

It is accordingly a general object of this invention to provide an improved adjustable support assembly for affixing one article or member to another article or member.

Another object of the present invention is an improved adjustable support assembly that provides a plurality of wedging elongated eyes spaced along at least a portion thereof in order to provide, in combination with the free ends of the device, one-way securement means for affixing the free ends to a selected location along the device.

Another object of this invention is to provide an improved adjustable air brake hose support mechanism for a railway car.

Another object of the present invention is to provide an improved support mechanism for the bottom rod of a brake mechanism of a railway vehicle.

Another object of this invention is to provide an improved device for securing a supporting member such as a suspended conduit-like member to a support member of a mechanism such as a road or railway vehicle.

Another object of the present invention is to provide an improved device for attaching articles together while permitting limited relative movement of the articles with respect to each other.

Another object of this invention is to provide an improved secondary or safety support mechanism.

Another object of the present invention is to provide an assembly for securing and closely affixing one member to another.

These and other objects of the present invention will be apparent from the following detailed description thereof, taken in conjunction with the accompanying drawings, wherein:

FIG. 1 is a perspective view of the adjustable support assembly according to this invention illustrated in use for suspending the glad hand end of a railway hose from an aperture projecting from the coupler of a railway vehicle;

FIG. 2 is an elevational view, partially broken away, of the adjustable support assembly according to this invention;

FIG. 3 is a perspective view similar to FIG. 1 but having a shorter suspension length;

FIG. 4 is a perspective view illustrating the adjustable support assembly according to this invention supporting a conduit-like member such as a bottom rod of a railway vehicle brake assembly, from a supporting member such as a beam of the vehicle;

FIG. 5 is a perspective view of another embodiment of this invention;

FIGS. 6, 6A and 6B are perspective views of further embodiments of one-way means of the invention;

FIG. 7 is a perspective view of an embodiment of the invention including a multi-piece one-way means;

FIG. 8 is an elevational view of an embodiment of the invention having a plurality of one-way means;

FIG. 9 is a perspective view of another embodiment of the invention illustrated in use for suspending the glad hand end of a railway hose;

FIG. 10 is a perspective view of a variation of the embodiment illustrated in FIG. 9;

FIG. 11 is a perspective view of an optional structural feature of this invention; and FIG. 12 is a perspective view of an additional embodiment of this invention shown for use in suspending an elongated span such as that of a suspended utility line;

The adjustable support assembly, which is generally illustrated at 11, includes inelastic, flexible cables 12 and 13, at least one of said cables 12 or 13 including at least one extended section 14 thereof, said extended section 14 including one-way means such as a tapered-stop bullet member 15 illustrated at the free end of same. The inelastic, flexible cables 12, 13 are secured together by a plurality of retaining members 16.

Retaining members 16 and inelastic, flexible cable members 12 and 13 cooperate to form, in combination, a wedging elongated eye 17. The retaining members 16 are spaced along the adjustable support assembly 11 in order to form a series of wedging elongated eyes 17 to thereby contribute to the adjustability of the adjustable support device 11 in order to provide a plurality of locations through which the bullet member 15 may pass.

With more particular reference to the elongated eye 17, each eye 17 illustrated in FIG. 2 is shown in its at rest, generally closed orientation. In such generally closed orientation, sections 18, 19 of cables 12, 13 are positioned generally opposite, or substantially juxtaposed, to each other, although typically not truly parallel to each other, throughout the length of the sections 18 and 19. Due to the structure of the elongated eye 17, it imparts a wedging condition to the adjustable support assembly due in part to the stiffness and inelasticity of the cables 12 and 13 which impart a biased condition to the elongated eyes 17 in order to maintain their wedgingly closed orientation. Cables 12 and 13 and elongated eyes 17 are sufficiently resilient in their generally transverse dimension such that the elongated eyes 17 will each expand from a biased generally closed orientation to an expanded orientation as the one-way member 15 passes through the eye. After the one-way member 15 has passed therethrough, the eye 17 will substantially return to its biased generally closed orientation.

More specifically, each cable 12 and 13 is flexible enough to allow for bending same upon itself and looping of the entire adjustable support assembly 11 about itself and about other members or articles, while still exhibiting an inelastic condition whereby each cable 12, 13 generally cannot be compressed or extended in its longitudinal direction. In other words, although the support assembly 11 and the individual cables 12, 13 are bendable, they are not stretchable. Each retaining member 16 is rigidly secured in place and thereby rigidly secures together the respective ends of the sections 18 and 19 in order to form joints 21 which join the ends of sections 18 and 19 and the retaining member 16 in a compact and rigid manner so as to approximate a unitary joint typically having a strength equal to or greater than that of the individual cables 12 and 13.

Typically, the retaining member 16 will be rigidly secured in place in order to form the joint 21 by rollforming the retaining member 16 around the cables 12 and 13. Added strength may be imparted to the joint 21 by crimping or welding the retaining member 16, although such is typically unnecessary. Retaining member 16 is usually in the form of a sleeve as illustrated in the drawings. Whatever structural features are utilized, the retaining member 16 does not allow the cables 12 and 13 to slip or move relative to each other.

The unitary nature of the joint 21 and the inelastic and limited bendability of the cables 12 and 13 cooperate to provide an elongated eye 17 that is biased to retain its generally closed orientation and wedge the bullet member 15 within a wedging portion 22 thereof, this bias being of a magnitude to permit passage of the bullet member 15 through the biased elongated eye 17 in a direction of the free or leading end of the bullet member 15 while also preventing unintentional re-passage of the bullet member 15 through the elongated eye in the direction opposite to the free or leading end thereof.

Bullet member 15 has a tapered leading end 23 which may be of any suitable shape for facilitating leading direction passage of the bullet member 15 through the elongated eye 17. This tapered leading end 23 can be conically shaped as illustrated, or it can be characterized by other tapered shapes such as wedge-shaped, V-shaped, or the like. Bullet member 15 includes a blunt end 24 which is at the trailing end of the bullet member 15, this being the end opposite to the tapered leading end 23. Blunt end 24 preferably has a stop surface that is generally radially extending. By virtue of the blunt end 24 of the bullet member 15 and the wedge configuration and biased condition of the elongated eye 17, once the tapered leading end 23 and then the rest of the bullet member 15 pass through the elongated eye 17, unintentional passage of the bullet member 15 out of the elongated eye 17 is prevented by virtue of the fact that the blunt end 24 abuts the wedging portion 22 of the elongated eye 17 as the extended section 14 and bullet member 15 are urged in the trailing direction.

Preferably, the entire adjustable support assembly 11 is made of metal in order to provide an especially strong and durable device. Other materials could be utilized provided they bring with them the physical properties needed to allow the adjustable support assembly 11 to be bent upon itself while providing the strength and rigidity needed to form the elongated eye 17 and its wedging portions 22. Preferably, the cables 12 and 13 are constructed of braided galvanized steel strands of the type generally referred to as aircraft cable, and the retaining members are made of relatively heavy-gauge material such as aluminum tubing or other metal that is malleable enough to form the rigid joint 21 while being strong enough to maintain the needed rigidity of the joint 21 during use of the adjustable support assembly 11. Bullet member 15 is also preferably made of galvanized steel or the like, the bullet member 15 being permanently secured to the extended section 14 by any suitable means or combinations thereof such as welding, force fitting and/or crimping.

With more particular reference to FIG. 1, the glad hand end 25 of a railway hose such as an air brake hose or steam hose is suspended from a railway coupler 26 by the adjustable support assembly 11. More particularly, one of the bullet members 15 is inserted through a hanger bracket 27 affixed to the glad hand end 25, and the lower extended section 15 also passes therethrough until the bullet member 15 is aligned with one of the elongated eyes 17 and then passed therethrough, after which the blunt end 24 is allowed to abut against the wedging portion 22 of the elongated eye 17. In addition, the other bullet member 15a that is secured to the upper extended section 14a is secured to the coupler bracket 28, as is the extended section 14a, after which the bullet member 15a is passed through an elongated eye 17a that is selected to provide the desired spacing between the glad hand end 25 and the coupler 26.

FIG. 3 illustrates the use depicted in FIG. 1 wherein the elongated eye 17b is selected in order to provide a desired closer spacing between the hanger bracket 27 and the coupler bracket 28 than is illustrated in FIG. 1 by inserting the bullet member 15 through a relatively distant elongated eye 17. In the instance shown in FIG. 2, both of the bullet members 15, 15a pass through the same elongated eye 17b. Additionally, for example, bullet member 15a can be inserted through an elongated eye 17c. If desired, a closer fit between the hanger bracket 27 or the like and the extended section 14 can be achieved by first passing the bullet member 15 through the lowermost elongated eye 17c and then weaving the bullet member 15 through other elongated eyes such as 17b. This weaving feature is shown in phantom in FIG. 3. Similar weaving can be accomplished with respect to the other extended section 14a. Additionally, multiple adjustable support assemblies 11 may be joined end-to-end to each other in order to span a greater length than is possible for a single adjustable support assembly, such as, for example, as illustrated in FIGS. 9 and 10.

The use illustrated in FIG. 4 is of the type whereby the adjustable support assembly 11 is wrapped around an elongated member 29 which may be the bottom rod of a railway brake mechanism, an exhaust pipe or the like. Additionally, the free ends of the adjustable support assembly 11, including the extended sections 14, 14a, are wrapped around a supporting member 31 which may be a railway brake beam, a section of the undercarriage of a vehicle, or other supporting structure. In this illustrated use, the bullet member 15 and extended section 14 are looped around the supporting member 31 and the bullet member 15 is passed through a selected elongated eye 17. Then the cable is positioned under the elongated member 29, and the bullet member 15a and the extended section 14a are looped around the supporting member 31, in either generally parallel or crossed orientation (shown in phantom), after which the bullet member 15a is passed through the elongated eye 17a. Should it be desired to bring the elongated member 29 and supporting member 31 into closer proximity with each other and, if desired into secure engagement with each other, then elongated eyes which are more central to the adjustable support assembly 11 are chosen for passage of the bullet members 15, 15a therethrough.

If desired, another extended section 32, illustrated in phantom in FIG. 2, can be included in said adjustable support assembly 11. Such another extended section 32 either provides additional strength to the overall adjustable support assembly by providing dual attachment means, or such another extended section 32 permits the joining of three components, members or articles by means of the adjustable support assembly. Additionally, an elastic member 33, shown in phantom in FIG. 2, may be attached to the adjustable support assembly in order to include a flexible, elastic portion to the assembly which increases and/or facilitates the overall adjustability of the assembly.

When it becomes necessary to release the one-way member 15 from the elongated eye, in most applications there will be enough slack in the extended section 14 to allow the one-way member 15 to be pulled further in the leading direction thereby moving some of that slack from the trailing direction side of the elongated eye 17 to its leading direction side, after which the one-way member 15 is reinserted through the same elongated eye 17 in the direction opposite to its initial direction of insertion through the elongated eye 17. In certain other applications, such as that shown in FIG. 4, the requisite slack is not present, and it is necessary to pry the cable sections 18, 19 apart to thereby open the elongated eye 17 far enough to permit passage of the blunt end 24 and the one-way member 15 therethrough in order to release the adjustable support assembly 11.

In the embodiment illustrated in FIG. 5, the one-way member includes, in addition to the tapered stop such as a bullet member 15, an untapered stop member 34. The untapered stop 34 is closely spaced from the blunt end 24 of the one-way member 15 by a distance that is greater than the diameter of the cables 12, 13 and less than a length that permits reinsertion of the one-way member 15 through the elongated eye 17 in the direction opposite to that of insertion, which is typically not substantially greater than the length of the one-way member 15. Cables 12, 13 are thereby bracketed by the blunt end 24 and a blunt end 35 of the untapered stop member 34. This structure provides an antipilferage feature to the adjustable support assembly by substantially preventing passage of the extended section 14 beyond the location at which the blunt end 35 engages the elongated eye 17.

With reference to FIG. 6, the tapered one-way member 36 of this embodiment includes an aperture 37 for receiving a padlock (shown in phantom) or other removable member that is of a size that is larger than the elongated eye 17 so as to prevent passage of this one-way member 36 through the elongated eye 17 in the reinsertion direction. Yet, when the removable member is not within the aperture 37, the one-way member 36 can be pulled in the leading direction away from the elongated eye 17 and then reinserted through the same elongated eye 17 in the direction opposite to its initial direction of insertion therethrough.

Alternatively, again without a removable member secured through the tapered one-way member 36, the tapered one-way member 36 or the like can be grasped and rotated from the orientation shown in FIG. 6 (with the narrower transverse dimension of the blunt end of the member 36 being generally parallel to the eye 17). When such rotation proceeds through approximately 90°, the broader transverse dimension (which is the dimension of the member 36 that extends generally into the paper as shown in FIG. 6) assumes an orientation generally parallel to the eye 17, and the member 36 is oriented so that it readily passes through the eye 17. If the one-way member 36 does not include the aperture 37 and its surrounding structure (such as the wedge-shaped member 36a of FIG. 6A or the V-shaped member 36b of FIG. 6B), or if such structure surrounding aperture 37 is narrower than illustrated in FIG. 6, the thus rotated member 36 can pass through the eye 17. Even if the member 36 is exactly as illustrated in FIG. 6, such passage through the eye can be completed by permitting the rotated member 36 to return to the FIG. 6 orientation once the blunt end and its broader transverse dimension has passed through the eye 17.

FIG. 7 represents another one-way member 38, which is multi-pieced. This multi-pieced one-way member 38 includes a stop member 39 having blunt ends 24, 41 at both longitudinal edges thereof. A tapered cap 42 is sized and structured to overlie the blunt end 41 of the stop member 39. In use, the tapered cap 42 is inserted onto the stop member 39 when it is desired to pass the one-way member 38 through the elongated eye 17, whether in the initial insertion direction or in the opposite, reinsertion direction. After initial insertion, the tapered cap 42 can be removed to thereby expose the blunt end 41, which is sized to substantially prevent passage of the stop member 39 through the elongated eye 17. Alternatively, the stop member 39 can be passed though the elongated eye 17 by orienting its generally cylindrical longitudinal surface to be generally parallel to the elongated eye 17, whereby this longitudinal surface is the tapered surface of the one-way member 38 that permits its passage through the eye 17.

A plurality of one-way members 43, 44 are included in the embodiment of FIG. 8. One such one-way member is a terminal one-way member 43 secured to the extended section 14a, while the others are intermediate one-way members 44 which are secured to the extended section 14a and spaced therealong to provide lengths 45 of extended section 14a between the one-way member 43, 44. The effective length of the extended section 14a is variable by selectively passing the one-way member 43, 44 through the elongated eye 17, thereby enhancing the adjustability of the overall adjustable support assembly.

FIG. 9 explicitly illustrates joining a plurality of adjustable support assemblies 11 by passing a one-way member 15 of one of the assemblies 11 through an elongated eye 17' of another assembly 11'. The elongated eyes 17, 17' are selected to provide the desired length of the assemblies 11, 11' to be utilized for the particular application. Also illustrated are extended sections 14c and 14d, each having a length shorter than that shown in FIG. 1 to more precisely wrap around or through the items 25, 28 being joined or suspended and in order to join the assemblies 11 with reduced play at the joined one-way members 15, 15' and elongated eyes 17, 17'.

Even shorter extended sections 14e, 14f are illustrated in FIG. 10, the lengths being such that the extended sections 14e, 14f cannot be bent or otherwise formed to an extent that would enable substantial movement of the one-way members 15, 15', such as a reinsertion movement that would pass the one-way members 15, 15' back through the elongated eyes 17, 17' in the opposite direction. If desired, the length of the one-way members 15, 15' can be such that the retaining members 16a that are adjacent to the extended sections 14e, 14f will butt against each other as shown in order to even more securely affix the two assemblies together and increase the effort needed to disjoin the assemblies from each other.

An optional feature of this invention is illustrated in FIG. 11. At least one of the ends of the adjustable support assembly 11' has a hook assembly 46 rather than a one-way means 15. The hook assembly 46 is especially useful in applications such as illustrated in FIG. 4 wherein it is not possible to release the one-way member 15 from the elongated eye 17 by reinserting the one-way members 15 through the elongated eye 17. Hook assembly 46 includes a hook-shaped member 47 that is securely joined to the extended section 14 at a location therealong such that a free end section 48 of the extended section 14 projects beyond the secure joint 49 and into the hook-shaped member 47 typically at an orientation such that the extreme end 51 of the free end section 48 is closely adjacent to, or in actual engagement with, the free end 52 of the hook-shaped member 47. In any event, the spatial interrelationship between the hook-shaped member 47 and the free end section 48 is adequate to permit, by flexure of the free end section 48, passage of a member such as cable 12, 13 or brackets 27, 28 between the extreme end 51 and the free end 52. Preferably, because the section 14 is typically multistranded, the extreme end 51 of the free end section 48 includes binding means, whether such is a rigid cap or a welded or fused portion.

FIG. 12 illustrates utilization of this invention for suspending articles over an especially elongated span, such as that between utility poles. In this embodiment, a plurality of adjustable support assemblies such as 11 or 11', or an exceptionally long assembly, is suspended at both free ends to rigid structures (not shown) such as utility poles, buildings or the like. A plurality of suspending assemblies, which may be adjustable support assemblies such as 11 or 11' or other suspending structures on the order of those shown in FIG. 12, are secured to the elongated eyes 17 and looped around the article 53 being suspended, which may be a utility cable.

Each of the illustrated suspending structures include an inelastic, flexible elongated member 54 and at least one one-way member 15. One of these suspending structures has an end stop member 55 that is sized to substantially prevent its passage through the elongated eyes 17 while the stop member 55 is generally transversely oriented with respect to the eye 17, as illustrated. Another embodiment includes a fastener member 56 that attaches the suspending structure to one of the cables 12, 13. A further embodiment provides a plurality of one-way members including a terminal one-way member 43 and an intermediate one-way member 44 to enhance the adjustability of the suspending structure.

It will be apparent to those skilled in this art that the present invention can be embodied in various forms; accordingly, this invention is to be construed and limited only by the scope of the appended claims.

What is claimed is:

1. An adjustable support assembly comprising a plurality of inelastic, flexible and stiff cables and a plurality of retaining members spaced along and rigidly secured to said stiff cables, said cables and said retaining members forming, in combination, a series of stiff elongated eyes, said stiff cables of the elongated eyes being sufficiently resilient in their generally transverse dimension such that said elongated eyes will expand and snap back to a generally closed position, said stiff cables of the elongated eyes being biased toward a generally closed orientation to provide a wedging portion at which at least a section of each of said stiff cables is substantially juxtaposed with respect to the other, at least one of said inelastic, flexible and stiff cables extends beyond an outermost retaining member, said at least one cable having a free end, said free end includes one-way means, said one-way means having a leading end and a trailing end, said elongated eye and its wedging portion being sized and structured to permit passage of said one-way means through said elongated eye, said trailing end of the one-way means having an integral stop that is sized to provide a rigid abutment between said elongated eye and said trailing end of the one-way means, and said abutment restrains passage of the one-way means in a direction toward said abutment between the elongated eye and the integral stop.

2. The adjustable support assembly of claim 1, wherein said one-way means is a bullet-shaped member.

3. The adjustable support assembly of claim 1, wherein each cable is flexible to the extent that same is bendable on itself and around another member, and wherein each cable is inelastic to the extent that same is not substantially stretchable or compressible.

4. The adjustable support assembly of claim 1, wherein said retaining members are rigid sleeves.

5. The adjustable support assembly of claim 1, wherein said stop of the one-way means is a blunt end at the trailing end thereof.

6. The adjustable support assembly of claim 1, wherein said inelastic, flexible cables, said retaining members and said one-way means are metal.

7. The adjustable support assembly of claim 1, wherein at least two of said inelastic, flexible cables each have a free end having one-way means.

8. The adjustable support member of claim 1, further including an elastic member firmly secured to said inelastic cables at a location other than said free end.

9. The adjustable support assembly of claim 1, wherein the one of said inelastic flexible cables that has one-way means at its free end defines an elongated section on one end of the assembly, and another elongated section is on said one end of the assembly, said another elongated section having one-way means at its free end.

10. The adjustable support assembly of claim 1, further including an untapered stop member that is secured to said cable, said untapered stop member being closely spaced from the one-way means in a direction away from the free end of the cable.

11. The adjustable support assembly of claim 1, wherein another one-way means is secured to said cable, said another one-way means being spaced from said one-way means at the free end in a direction away from the free end.

12. The adjustable support assembly of claim 1, wherein a plurality of adjustable support assemblies are joined to each other and one-way means of one adjustable support assembly is inserted through an elongated eye of another support assembly.

13. The adjustable support assembly of claim 1, further including a suspending assembly for passage through the elongated eye of the adjustable support assembly.

14. The adjustable support assembly of claim 13, wherein said suspending assembly includes an inelastic, flexible elongated member and a one-way member.

15. The adjustable support assembly of claim 13, wherein said suspending assembly includes an inelastic, flexible elongated member and a one-way member at each end thereof.

16. The adjustable support assembly of claim 13, wherein said suspending assembly includes an inelastic, flexible elongated member, a one-way member, and a stop member.

17. The adjustable support assembly of claim 13, wherein said suspending assembly includes an inelastic, flexible elongated member, a one-way member, and a fastener member.

18. The adjustable support assembly of claim 13, wherein said suspending assembly includes an inelastic, flexible elongated member, a one-way member secured to a free end of the elongated member, and another one-way member secured to said elongated member and spaced from said free-end one-way member.

19. The adjustable support assembly of claim 1, wherein said leading end of the one-way means is generally wedge-shaped.

20. The adjustable support assembly of claim 1, wherein said leading end of the one-way means is generally V-shaped.

21. The adjustable support assembly of claim 1, wherein said leading end of the one-way means is generally conically shaped.

22. The adjustable support assembly of claim 1, wherein said leading end of the one-way means is tapered.

23. The adjustable support assembly of claim 1, wherein said leading end of the one-way means is generally wedge-shaped, having a narrow transverse dimension and a broad transverse dimension.

24. The adjustable support assembly of claim 1, wherein said leading end of the one-way means is generally V-shaped, having a narrow transverse dimension and a broad transverse dimension.

25. An adjustable support assembly comprising a plurality of inelastic, flexible cables and a plurality of retaining members spaced along and rigidly secured to said cables, said cables and retaining members forming, in combination, a series of elongated eyes, said elongated eyes having a wedging portion at which at least a section of each of said cables is substantially juxtaposed with respect to the other, at least one of said inelastic, flexible cables extends beyond an outermost retaining member, said at least one cable having a free end, said free end includes one-way means, said one-way means having a leading end and a trailing end, said elongated eye and its wedging portion being sized and structured to permit passage of said one-way means through said elongated eye, said trailing end of the one-way means having a stop that is sized to provide a rigid abutment between said elongated eye and said trailing end of the one-way means, and said abutment retrains passage of the one-way means in a direction toward said abutment between the elongated eye and the stop, wherein said at least one of said cables that extends beyond the outermost retaining member extends beyond the outermost retaining member for a length that is less than that needed to twice feed the one-way means, in the direction of its leading end, through the elongated eye.

26. An adjustable support assembly for securing components such as air brake hose, brake bottom rods and the like to railway vehicles and the like, said adjustable support assembly comprising a plurality of inelastic, flexible cables and a plurality of retaining members spaced along and rigidly secured to said cables, said cables and said retaining members forming, in combination, a series of elongated eyes, said elongated eyes having a wedging portion at which at least a section of each of said cables is substantially juxtaposed with respect to the other, at least one of said inelastic, flexible cables extends beyond another of said inelastic, flexible cables, said one cable having a free end, said free end including one-way means, said one-way means having a leading end and a trailing end, said elongated eye and its wedging portion being sized and structured to permit passage of said one-way means through said elongated eye, said trailing end of the one-way means having a stop that is sized to provide a rigid abutment between said elongated eye and said trailing end of the one-way means, said abutment restraining passage of the one-way means in a direction toward said abutment between the elongated eye and the stop, and a component is suspended from a member of a vehicle by wrapping a portion of the adjustable assembly around the vehicle member and by wrapping another portion of the adjustable support assembly around the component.

27. The adjustable assembly of claim 26, wherein said elongated eye is metal and is biased toward a generally closed orientation.

28. The adjustable assembly of claim 26, wherein the portion of the adjustable assembly that is wrapped around the vehicle member intersects another portion of the adjustable assembly that is wrapped around the vehicle member.

29. An improvement in railway car construction having a conduit extending beneath a railway car, a support assembly for suspending the conduit from the railway car, wherein the improvement comprises an adjustable support assembly including a plurality of inelastic, flexible and stiff cables and a plurality of retaining members spaced along and rigidly secured to said stiff cables, said cables and said retaining members forming, in combination, a series of stiff elongated eyes, said stiff cables of the elongated eyes being sufficiently resilient in their generally transverse dimension such that said elongated eyes will expand from and snap back to a substantially closed position, said stiff cables of the elongated eyes being biased toward a generally closed orientation to provide a wedging portion at which at least a section of each of said stiff cables is substantially juxtaposed with respect to the other, at least one of said inelastic, flexible and stiff cables extends beyond another of said inelastic, flexible and stiff cables, said at least one cable having a free end, said free end includes one-way means, said one-way means having a leading end and a trailing end, said elongated eye and its wedging portion being sized and structured to permit passage of said one-way means through said elongated eye, said trailing end of the one-way means having an integral stop that is sized to provide a rigid abutment between said elongated eye and said trailing end of the one-way means, and said abutment restrains passage of the one-way means in a direction toward said abutment between the elongated eye and the integral stop.

* * * * *